Dec. 31, 1929. C. F. THOMPSON 1,741,799

STATOR FOR INDUCTION MOTORS

Filed March 27, 1929

Inventor:
Clifford F. Thompson
By: Albert Scheible,
Attorney.

Patented Dec. 31, 1929

1,741,799

UNITED STATES PATENT OFFICE

CLIFFORD F. THOMPSON, OF OAK PARK, ILLINOIS, ASSIGNOR TO BODINE ELECTRIC COMPANY, OF CHICAGO, ILLINOIS, A CORPORATION OF ILLINOIS

STATOR FOR INDUCTION MOTORS

Application filed March 27, 1929. Serial No. 350,289.

This application is a division of my copending application No. 287,687 entitled Stator for alternating current motors and filed June 23, 1928.

My invention relates to stators for alternating current induction motors and in its general objects aims to provide a simple, inexpensive and easily assembled stator construction which will afford a high starting torque for the motor and a small magnetic gap between the consecutive poles of the stator.

More particularly, my invention aims to provide a stator in which a simple pole extension member is held in operative position by two consecutive poles of the stator without requiring auxiliary fastening elements, and in which this pole extension member retains a shading coil in operative position with respect to a portion of one of these poles.

Still further and also more detailed objects will appear from the following specification and from the accompanying drawings, in which Fig. 1 is a fragmentary section through a laminated stator embodying my invention, taken along the face of a lamination of the stator.

Both the use of a pole extension for reducing the gap between consecutive poles, and the employment of a short-circuit coil (commonly termed a "shading coil") for affording a considerable starting torque, are particularly desirable in induction motors. Hence I am illustrating my invention in connection with a stator suitable for this type of electric motor, and in which the stator is constructed in the usual manner by assembling counterpart and flat stator laminations which extend radially of the stator.

Figure 1:
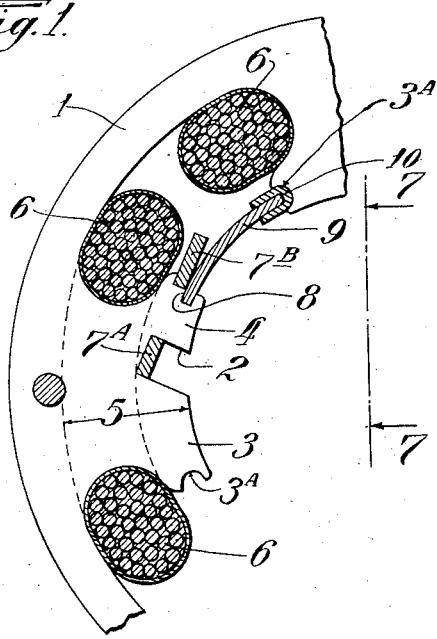

In the embodiment of Fig. 1, each such lamination has an outer annular rim portion 1 from which the poles extend radially inward of the lamination, and each pole has at its inner end a recess 2 subdividing the radially inward portion of the pole into a main pole 3 and a shaded pole 4, the shaded pole 4 being desirably of less width (circumferentially of the stator) than the main pole 3 and also considerably narrower than the distance between the shaded pole and the next consecutive main pole 4, portion 3A. This recess 2 desirably extends radially of the stator into the pole for only part of the radial length 5 of the pole, thus permitting the usual field coil 6 to extend around the radially outward solid portion from which the spaced poles 3 and 4 project inwardly.

Figure 4:
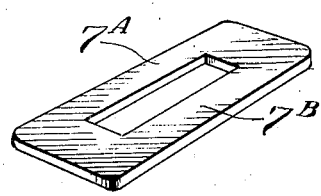
Fig. 4 is a perspective view of the shading coil.

Surrounding a portion of the shaded pole 4 is a shading coil which may be a simple loop punched from sheet copper and formed as shown in Fig. 4. One side member 7A of this shading coil seats on the bottoms of the recesses 2 in the stator laminations and desirably has its bore 8 of such a width and length as to fit snugly over the part of the shaded pole 4 housed by it, while the other side member 7B of the shading coil (which extends towards the next consecutive main pole) desirably is considerably wider.

Figure 2:
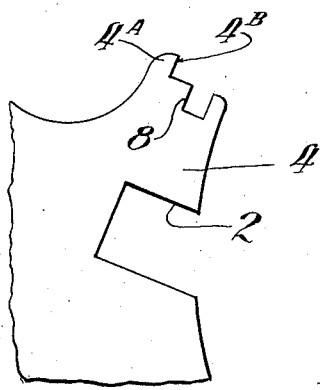
Fig. 2 is an enlarged elevation of a portion of one of the stator laminations.

The outer lateral side of the shaded pole 4 has a projection or ledge 4A (Fig. 2) spaced from the inner end of this pole and presenting a face 4B toward the axis of the stator, which face is desirably in the same plane with the bottom of the recess 2, so that the wider shading coil side 7B will seat on this ledge when the narrower shading coil side 7A is seated on the bottom of the recess.

This outer lateral side of the shaded pole also has groove 8 extending longitudinally of the stator and spaced from the inner end of the shaded pole, and the next consecutive main pole 3 has a longitudinal groove 3A facing the recess 8. These opposed grooves 8 and 3A cooperate for rigidly supporting a pole extension which includes a flat iron plate 9 of a thickness corresponding to the width of the groove 8, and a binding 10 fitted over the opposite longitudinal edge portion of the plate 9 and made of brass or other non-magnetic material. With the groove 3A of such a size that the binding 10 fits into it, and with the plate 9 of a suitable width, the two grooves cooperate in anchoring the pole extension when the latter is slid into place longitudinally of the stator.

And, with the shading coil of a thickness corresponding to the distance between the ledge face or shoulder 4B and the adjacent wall of the groove 8, the pole extension when thus inserted holds the shading coil firmly in its operative position, as shown in Fig. 1. The iron plate 9 is desirably bent transversely to such a curvature that its inward face will be concentric with the stator laminations.

Since both the shading coils and the pole extensions can easily be attached after the pre-wound field coils 6 have been slipped into position, the entire assembly is simple and quickly made. Each pole extension plate then greatly reduces the gap between the main pole and the shaded pole which are respectively adjacent to opposite sides of the pole extension, thereby reducing the magnetic loss in the motor, and each pole extension also acts as a retainer for the shading coil associated with one of the poles by which it is supported.

In practice, a thin strip of brass or the like clinched over one longitudinal edge of the pole extension plate 9 suffices for affording the needed magnetic gap adjacent to the pole which is unshaded, and such a non-magnetic binding can readily be clinched upon the pole extension plate after the latter is curved to extend concentric with the inner ends of the poles.

Figure 5:
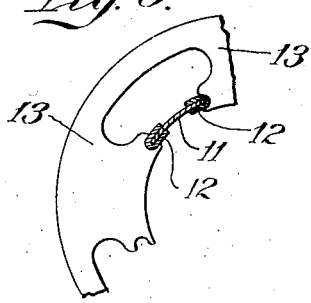
Fig. 5 is a view similar to Fig. 1 but with the coil windings omitted, showing another form of pole extension member.
Figure 3:
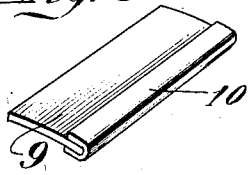
Fig. 3 is a perspective view of the pole extension member alone.
Figure 6:
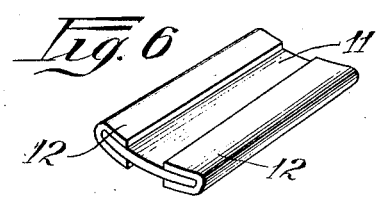
Fig. 6 is an enlarged perspective view of the pole extension member of Fig. 5.
Figure 7:
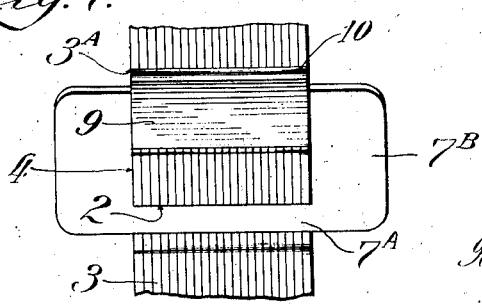
Fig. 7 is a fragmentary interior elevation of the stator of Fig. 1, taken from the line 7—7 of that figure.

However, while I have heretofore described an embodiment of my invention which includes numerous desirable details of construction and arrangement, I do not wish to be limited in these respects, as many changes might be made without departing either from the spirit of my invention or from the appended claims. For example, Figs. 5 and 6 show portions of another embodiment, namely one in which a pole extension plate 11 has a non-magnetic binding 12 fitted upon each longitudinal edge of this plate. In this case, the two poles 13 between which the pole extension member extends have opposed grooves fitting the laterally outward portions of the bindings 12.

Moreover, I do not wish to be limited to the use of my slidably attachable pole extensions in connection with shading coils retained by them, since they could also be employed in stators having no shading poles, as shown in Fig. 5.

I claim as my invention:

1. In a stator for motors, two consecutive poles spaced circumferentially of the stator, a pole extension plate of magnetizable material spanning the aforesaid poles near their inner ends, and a non-magnetic spacer interposed between one longitudinal edge of the pole extension plate and the pole adjacent to that edge.

2. In a stator for motors, two consecutive poles spaced circumferentially of the stator, a pole extension plate of magnetizable material spanning the aforesaid poles near their inner ends, and a non-magnetic spacer interposed between one longitudinal edge of the pole extension plate and the pole adjacent to that edge, the pole extension plate having its other longitudinal edge in direct engagement with the pole adjacent to that edge.

3. In a stator for motors, two consecutive poles spaced circumferentially of the stator, a pole extension plate of magnetizable material spanning the aforesaid poles near their inner ends, and a non-magnetic spacer interposed between one longitudinal edge of the pole extension and the pole adjacent to that edge, the non-magnetic spacer being secured to the pole extension plate.

4. In a stator for motors, two consecutive poles spaced circumferentially of the stator, a pole extension plate of magnetizable material spanning the aforesaid poles near their inner ends, and a non-magnetic spacer interposed between one longitudinal edge of the pole extension and the pole adjacent to that edge, and a shading coil extending around one of the poles and retained in position by the pole extension plate.

5. In a stator for motors, two consecutive poles spaced circumferentially of the stator and provided near their inner ends with opposed grooves extending longitudinally of the stator, a channel-sectioned non-magnetic liner seated in one of the said grooves and open towards the other groove, and a magnetizable pole extension plate having its lateral edges respectively seated in the said liner and in the said other groove.

6. In a stator for motors, two consecutive poles spaced circumferentially of the stator and provided near their inner ends with opposed grooves extending longitudinally of the stator; a shading coil extending around one of the poles, the said pole having a shoulder engaging an outward face portion of the shading coil; and a pole extension member engaging the inner face of the shading coil and having its longitudinal edge portions respectively socketed in the said two grooves.

7. In a stator for motors, two consecutive main poles spaced circumferentially of the stator and provided near their inner ends with opposed grooves extending longitudinally of the stator, a channel-sectioned non-magnetic liner seated in one of the said grooves and open towards the other groove, the portion of the said other groove which is radially inward of the stator being of greater depth than the portion of that groove which is radially outward of the stator; a shading coil surrounding a part of the main pole which has the said other groove, one side leg of the shading coil having its outer lateral edge portion seated in the said radially outward groove portion; and a magnetizable pole extension plate having its lateral edge portions respectively seated in the channel-sectioned liner and in the said radially inward groove portion, the pole extension plate engaging the radially inward face portion of the shading coil to clamp the shading coil against that wall of the said other groove which is radially outward of the stator.

Signed at Chicago, Illinois, March 23, 1929.

CLIFFORD F. THOMPSON.